United States Patent [19]
Hinman, Jr.

[11] 3,898,531
[45] Aug. 5, 1975

[54] SEGREGATED PHASE COMPARISON RELAYING APPARATUS

[75] Inventor: Walter L. Hinman, Jr., New Providence, N.J.

[73] Assignee: Westinghouse Electric Corporation, Pittsburgh, Pa.

[22] Filed: Jan. 25, 1974

[21] Appl. No.: 436,758

[52] U.S. Cl. .............................. 317/27 R; 317/47
[51] Int. Cl. ...................... H02h 3/38; H02h 7/26
[58] Field of Search ............ 317/44, 47, 27 R, 28 R, 317/29 R, 29 A, 29 B, 43; 307/232

[56] References Cited
UNITED STATES PATENTS

| | | | |
|---|---|---|---|
| 2,462,180 | 2/1949 | Goldsborough et al. | 317/29 A |
| 3,144,585 | 8/1964 | Blakemore | 317/29 R |
| 3,381,178 | 4/1968 | Rockefeller | 317/28 R |
| 3,470,418 | 9/1969 | Hagberg et al. | 317/27 R |
| 3,612,952 | 10/1971 | Hagberg | 317/27 R |
| 3,710,189 | 1/1973 | Hagberg | 317/27 R |

*Primary Examiner*—J. D. Miller
*Assistant Examiner*—Patrick R. Salce
*Attorney, Agent, or Firm*—J. L. Stoughton

[57] ABSTRACT

A reliable segregated phase comparison relaying apparatus for protecting a polyphase transmission line in which the phase conductors subjected to a ground or a residual fault may be easily detected and the fault current interrupted without a reduction in the security of the non-faulted phase conductors and in which the phase comparison function can be immediately interrupted as, for example, due to a complete or partial loss of signal while still maintaining a secure unblock tripping in the event of the occurrence of a fault during this interruption.

13 Claims, 5 Drawing Figures

FIG.I.

SEGREGATED PHASE COMPARISON RELAYING APPARATUS

CROSS-REFERENCE TO RELATED APPLICATIONS

This application claims an improvement in a segregated phase comparison relaying apparatus which is an improvement over that shown, in an application filed by me jointly with William Strickland in the United States Patent Office as Ser. No. 295,031 filed Oct. 4, 1972, abandoned in favor of continuation application Ser. No. 402,687 filed Oct. 2, 1973, now U.S. Pat. No. 3,893,008 dated 7-1-75.

BRIEF SUMMARY OF THE INVENTION

This invention relates to a polyphase relaying apparatus and more particularly to means for correctly identifying the phase conductor having a ground fault thereon even though the magnitude of the fault current is relatively small compared to the magnitude of the load current being carried thereby without decreasing the normal security which should be provided by the apparatus.

Figure 1:
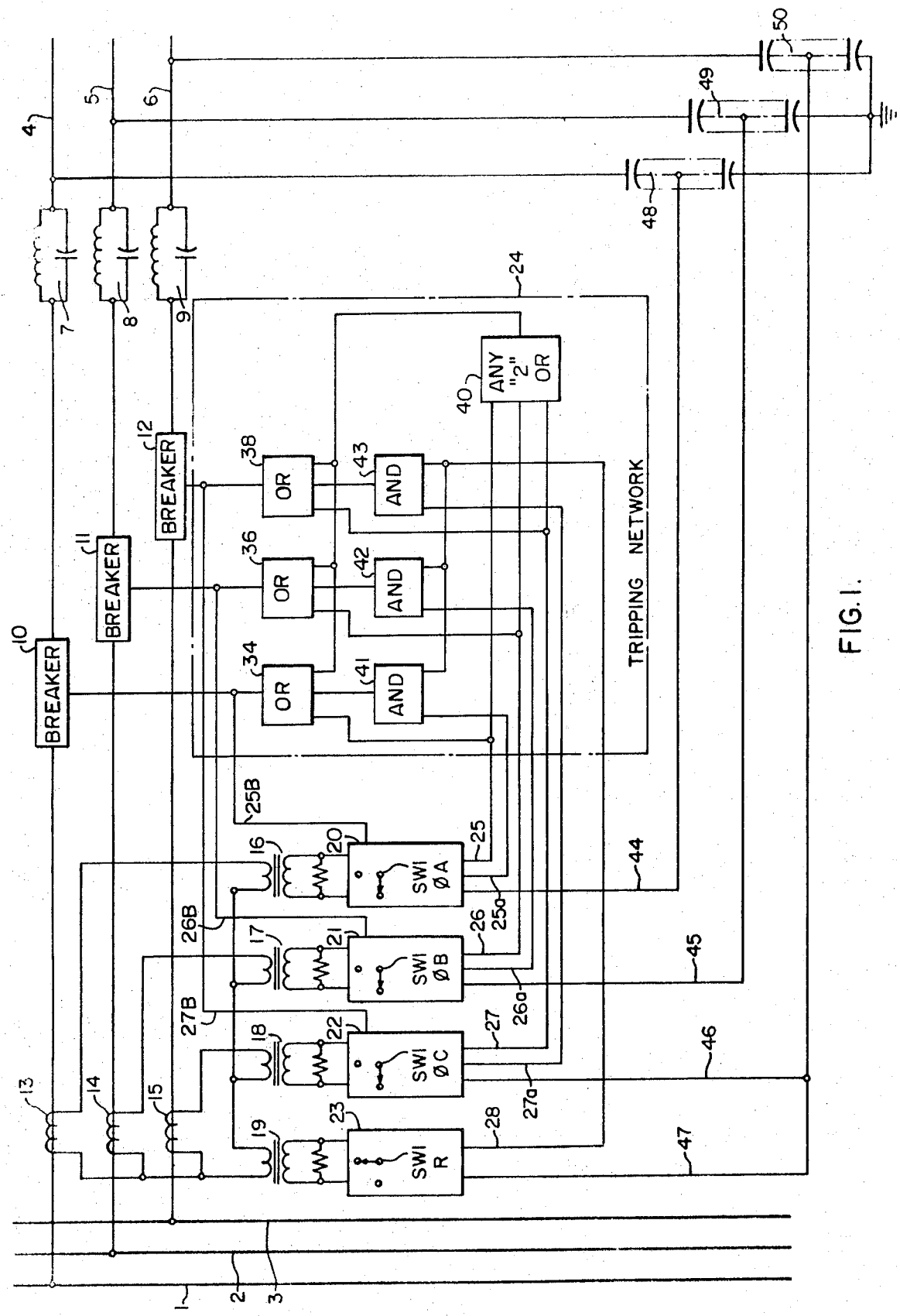
FIG. 1 is a schematic view of a relaying apparatus associated with a three-phase power transmission line and embodying the invention.

Referring to the drawings by characters of reference, the numerals 1, 2 and 3 indicate the phase busses of a three-phase power supply which are suitably energized from one or more power sources (not shown). Phase conductors 4, 5 and 6 of a three-phase power transmission line are energized respectively from the phase busses 1, 2 and 3 through low pass filters 7, 8 and 9 and breakers 10, 11 and 12. The low pass filters 7, 8 and 9 offer substantially no impedance to the transmission of current at the hertz of the transmitted power but provide a high impedance to the carrier hertz which transmits intelligence from the remote relaying apparatus at the remote station adjacent the remote busses BR (FIG. 4) over the transmission lines to the local relaying apparatus associated with the local busses BL which would comprise the busses 1, 2 and 3.

Current transformers 13, 14 and 15 are associated with phase conductors, 4, 5 and 6 and provide output quantities which are directly related to the current flowing through the phase conductors 4, 5 and 6. The output of the current transformers 13, 14 and 15 is applied to the primary windings of current isolating transformers 16, 17, 18 and 19 in the usual manner so that the output quantities of the transformers 16, 17 and 18 represent the current flowing through the phase conductors 4, 5 and 6, respectively, and the output of the current transformer 19 is a measure of the residual or ground current.

Each of the current transformers 16, 17, 18 and 19 have their secondaries individually connected to energize individual loading resistors so that the output quantities supplied to the phase current responsive relaying networks 20, 21 and 22 and to the residual or ground current relaying network 23 are voltage signals. The networks 20–23 are provided with individual output conductors 25–28, respectively, which normally are deenergized to provide logical 0 output signals but which will be energized to provide a logical 1 output signal in response to the operation of its associated fault detector described more fully below in connection with the description of FIG. 2.

A breaker tripping network 24 includes a plurality of OR networks 34, 36 and 38, an ANY-2-OR network 40 and AND networks 41, 42 and 43. Each of the OR networks 34, 36 and 38 has three input terminals. A first input terminal of these OR networks is connected respectively to the output conductors 25, 26 and 27 and of the networks 20, 21 and 22 associated with phases A, B and C. Each of the OR networks 34, 36 and 38 has a second input terminal individually connected to the output terminals of the AND networks 41, 42 and 43. A third output terminal of each OR network is connected together and to the output terminal of the ANY-2-OR network 40. The ANY-2-OR network 40 has its three input terminals connected individually to the conductors 25, 26 and 27 of the networks 20, 21 and 22. Each of the AND networks 41, 42 and 43 has a pair of input terminals, a first of each thereof being connected individually to the output conductors 25a, 26a and 27a of the networks 20, 21 and 22 and the other input terminals of the AND networks are connected together and to the output conductor 28 of the residual or ground network 23.

Figure 4:
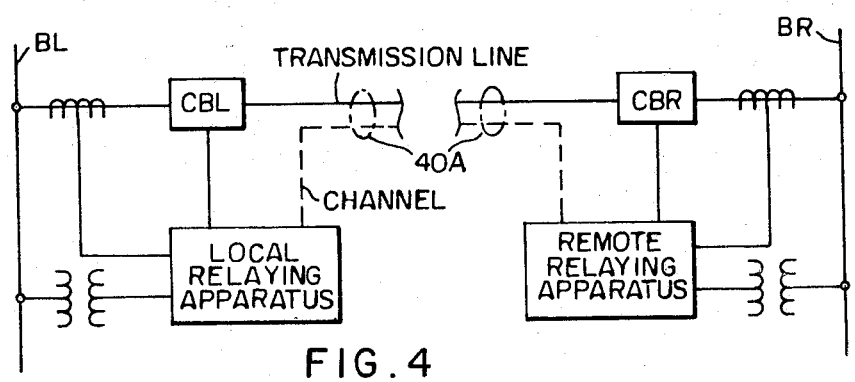
FIG. 4 is a one line diagram of a polyphase transmission line protected in accordance with the relaying apparatus of this application; and, FIG. 5 is a block diagram useful in understanding the invention.
Figure 5:
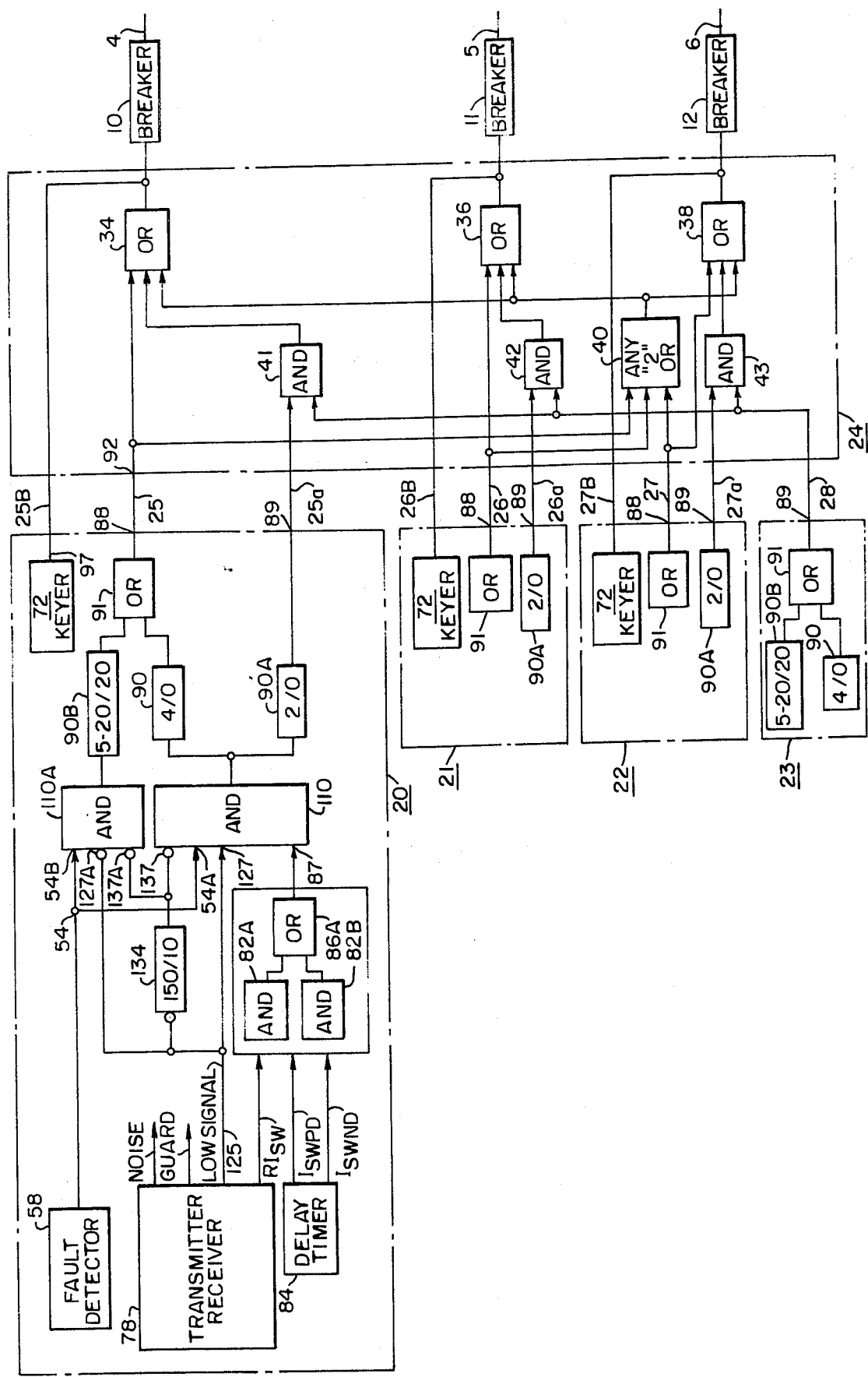

The networks 20, 21, 22 and 23 are coupled to the phase conductors 4, 5 and 6 through second output conductors 44, 45, 46 and 47 and coupling capacitors 48, 49 and 50. The networks 20–23 transmit and receive intelligence signals at power line carrier frequencies to and from current responsive relaying networks similar to the networks 20–23 and located at and similarly coupled to the remote terminal of the protected line section. Only the relaying networks 20–23 at the local end of the transmission line are illustrated in FIG. 1, FIG. 4 being utilized to show, in block form, the apparatus at the remote end of the transmission line.

While the transmission of intelligence between the remote and local stations is illustrated in this application as being by power line carrier it will be understood that other means may be used to transmit the intelligence, such as microwave or leased telephone circuits, among others. The communicating channel illustrated in dotted lines in FIG. 4 and identified by the reference character 40A will illustrate any means by which intelligence is transmitted between the remote and local relaying apparatuses.

Figure 2:
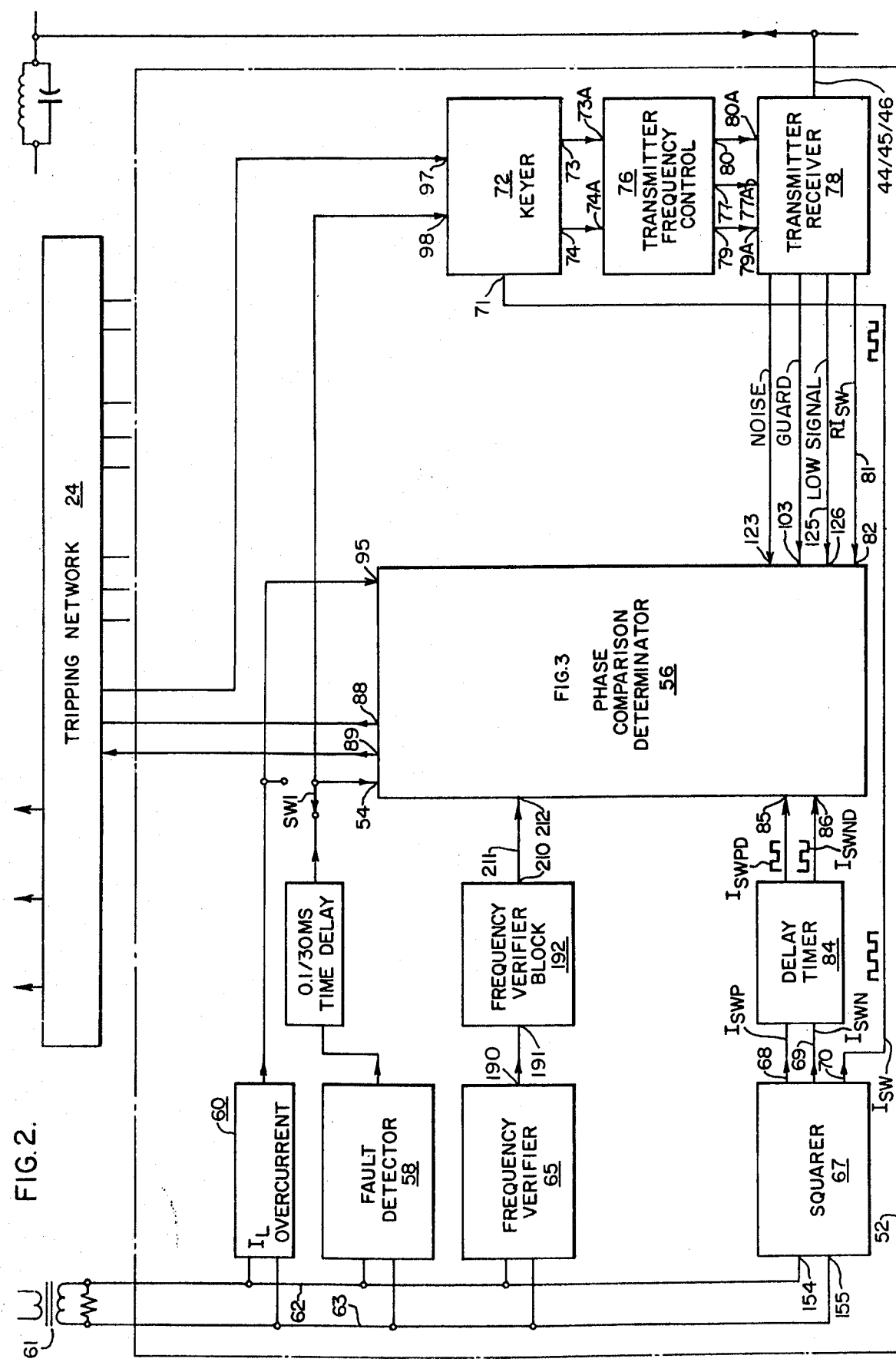
FIG. 2 is a more detailed schematic of the relaying apparatus which may be associated with the current transformer array associated with the three-phase conductors.

For purposes of simplifying the disclosure, only a single relaying network 52 is illustrated in FIG. 2. The network 52 may be used for any of the phase current or ground current responsive relaying networks 20, 21, 22 and 23. When used as a phase current network, 20, 21 or 22, the switch SW1 is in the illustrated position to connect the arming input terminal 54 of the phase comparison determinator 56 for actuation by the fault current change detector 58. When used for the residual or ground current network 23 the switch 21 may be in its other position as illustrated in FIG. 1 to use the $I_L$ overcurrent network 60 for ground current fault detection.

The relaying network 52 is provided with a current derived signal through the isolating current transformer 61 which corresponds to one of the isolating current transformers 16, 17, 18 or 19, depending upon its use in the FIG. 1 embodiment. The transformer 61 is provided with a loading resistor whereby the output busses 62 and 63 supply voltage signals to the $I_L$ overcurrent network 60, the fault detector or current change network 58, a frequency verifier network 65 and a squarer network 67.

The local squarer network 67 is provided with three output conductors 68, 69 and 70 which transmit square wave signals $I_{SWP}$, $I_{SWN}$ and $I_{SW}$ which are of the same hertz as that supplied to the busses 62 and 63 and are phase related thereto. The signal $I_{SW}$, as will be set forth below, provides an output signal which has a positive square wave portion, which is of the same phase as the voltage wave supplied to the local squarer and which is in phase with and of substantially identical length to the positive half cycle of the input voltage wave. The quantity $I_{SW}$ is supplied to the input terminal 71 of the keyer 72 and energizes its output conductor or terminal 73, with a signal which pulsates between a logical 1 and a logical 0 signal condition in synchronism with the pulsating $I_{SW}$ quantity. The terminal 73 is connected to one terminal 73A of a transmitter frequency control network 76.

Under normal non-fault conditions, logical 0 signals will be supplied from the tripping network 24 and from the fault detector 58 to the input terminals 97 and 98 of the keyer 72 to maintain a logical 1 output signal at terminal 74 which is connected to input terminal 74A of the transmitter frequency control 76. The squarer 67 normally continually supplies its $I_{SW}$ signal to the input terminal 71 to alternate the output signal at the terminal 73 and 73A between logical 1 and logical 0 states.

The transmitter frequency control 76 includes a pair of AND networks (not shown) connected to be driven by the logical signals supplied to the input terminals 73A and 74A. When a logical 1 signal is supplied to input terminal 74A both of the AND networks are in a condition to supply logical 0 outputs signals to the respective output terminals 79 and 80 to which they are connected and to the input terminals 79A and 80A of the transmitter receiver 78. The continuous logical 1 signal at terminal 74A maintains a logical 1 signal at terminal 77 and at the output terminal 77A of the transmitter receiver 78. The circuitry of the keyer 72, and of the transmitter control is more fully shown and described in said continuation application Ser. No. 402,687.

The transmitter portion of the transmitter-receiver 78 may take any form in which it transmits a signal at any one of three different frequencies depending upon which one of the three input terminals 77A, 79A or 80A is energized with a logical 1 signal.

Under normal non-fault conditions, a logical 1 signal will be present at the input terminals 74, 74A, 79 and 79A and the transmitter portion of the transmitter-receiver 78 will transmit a guard signal which, will prevent the phase comparison determinator from tripping the associated breaker. Upon the occurrence of a fault, the fault responsive network 58 will supply a logical 1 signal to terminal 98 causing the output terminal 74 to be energized with a logical 0 signal. When this occurs, the pulsating $I_{SW}$ signal will cause the sets of terminals 79–79A and 80–80A to alternate between logical 1 and logical 0 output signals to provide a trip + (trip positive) and trip − (trip negative) signals.

Preferably the frequency of the guard signal is outside of the range of the trip signal frequencies and preferably its frequency is less than the frequency of either of the trip signal frequencies. Alternatively, the guard and trip signals may comprise coded signals of one or more frequencies. The important element is that the signal frequency or coded signal sent and received supply the proper information to the receiving station as determined by the current condition at the sending station. The pulsations of trip + frequency and trip − frequency provide the receiver at the remote station with an exact indication of the current conditions at the local stations. Similarly, upon an occurrence of a fault at the remote station, the remote transmitter will transmit to the local receiver 78 and $RI_{SW}$ signal which is indicative of the current which energizes the remote relaying network.

Figure 3:
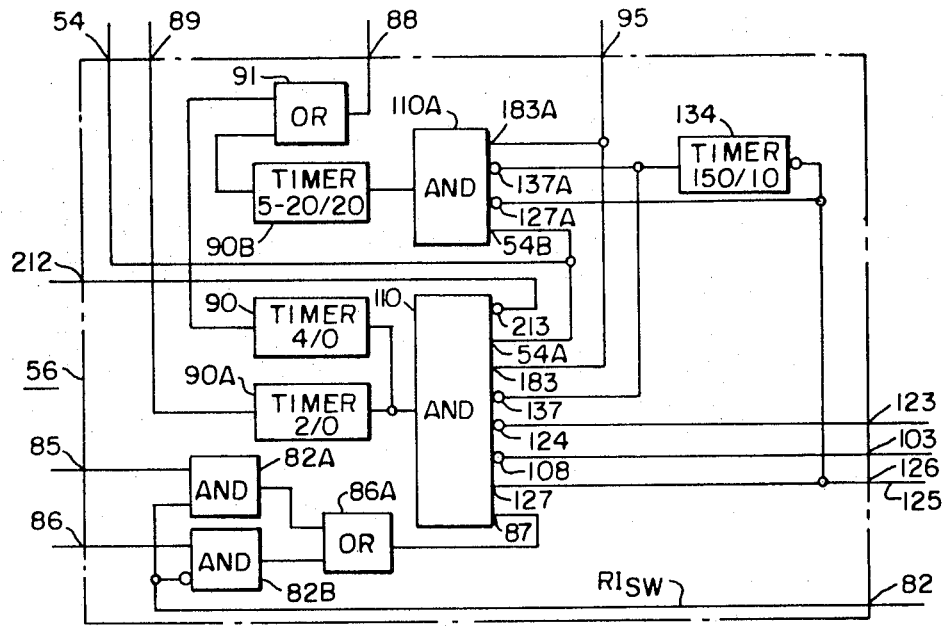
FIG. 3 is a schematic illustration of the circuitry which may be used to provide the phase comparison determination.

This quantity $RI_{SW}$, supplied by the receiver portion of the transmitter receiver 78, is transmitted over the conductor 81 to the input terminal 82 and thereby to a non-inverted input terminal of the AND network 82A (FIG. 3) and to the inverted or NOT input terminal of the AND network 82B of the phase comparison determinator 56. The quantity $RI_{SW}$ is compared with the quantities $I_{SWPD}$ and $I_{SWND}$, furnished by the squarer 67 through the delay timer 84 to the input terminals 85 and 86 and to the non-inverted input terminals of the AND networks 82A and 82B. The output terminals of the AND networks 82A and 82B are connected through an OR network 86A to an input terminal 87 of the AND network 110.

The delay timer 84 delays the quantities supplied by the squarer 67 for an interval equal to the interval required for the transmitted quantity from the remote station to be received by the local station transmitter 78 and to be supplied to the AND networks 82A and 82B. The squarer 67 and delay timer 84 are more fully shown and described in said continuation application Ser. No. 402,687. If the comparison of the quantities $RI_{SW}$ and $I_{SWPD}$ and $I_{SWND}$ supplied by the AND networks 82A and/or 82B indicate simultaneous in-flow and simultaneously out-flow of current at the remote and local stations into and out of protected section of the transmission line, the AND network 110 will energize its output terminal (assuming a full arming thereof as will be described below) to initiate the 4 millisecond timing out of the time delay network 90. When timed out, the time delay network 90 actuates the OR network 91 and thereby the output terminal 88 of the network 56 which as shown in FIG. 2 is connected to the input terminal 92 of the tripping network 24.

The $I_L$ overcurrent network 60 associated with the networks 20, 21 and 22 normally supplies logical 1 signals to the input terminal 95 of its associated phase comparison determinator 56. This places an arming signal on the input terminal 183 of AND network 110 and input 183A of AND network 110A.

A fault detector 58 is energized from the busses 62 and 63 and has its output connected through terminal 54 to input terminals 54A and 54B of the AND networks 110 and 110A. Upon the occurrence of a fault, the detector 58 supplies a logical 1 arming signal to terminals 54A and 54B. In the case of the residual or ground fault network 23, the switch SW1 is set to connect the output of the network 60 directly to the input terminal 54. The residual current, in the absence of a ground fault, will be non-existent or at least sufficiently low so that the $I_L$ network 60 will maintain a logical 0 output signal on input terminal 54A. If a ground fault occurs a logical 1 signal is supplied so that the $I_L$ network 60 may be used as a fault detector and the fault detector 58 omitted. The fault detector 58 and $I_L$ overcurrent network 60 are more completely shown and described in said continuation application Ser. No. 402,687.

Assuming that phase conductor 4 is faulted to ground through a relatively low resistance path and the fault current magnitude is greatly in excess of any load current magnitude, the logical 1 signal on output conductor 25 is supplied to one of the input terminals of the OR network 34. The OR network 34 then supplies a trip signal over conductor 31 to cause the breaker 10 to trip and interrupt the fault current. With a large fault current, the relative phase of the current at each end of the phase conductor 4 is nearly 180°. Assuming a 60 hertz frequency of the transmission line, the logical 1 output signal of the AND network 110 will exist for at least 6 milliseconds which is sufficient to cause the 4 millisecond timer 90 to time out.

Assume now that the fault is through a relatively high resistance of for example 100 ohms and the magnitude of the fault current is a much smaller portion of the load current magnitude. Under these conditions, the relative phase of the current at the local and remote ends of the faulted phase conductor can be much less than 180° and may approach an angle as low as 70° so that the time interval that logical 1 signal is maintained on the input terminal 54A of the AND network 110 for only about 3 ms. Under this condition, the timer 90 would not time out and there could be no tripping of the breaker 10 to clear the fault. If the timer 90 were adjusted to trip in less than 4 ms. a low power factor load with no ground fault could conceivably cause the timer 90 to time out and falsely trip the breaker 10 which of course is highly objectionable.

In accordance with the teachings herein, there is provided a second timer 90A which is set to time out in 2 ms. the timer 90A cannot by itself cause the breaker 10 to trip. When the timer 90A times out its supplies a logical 1 signal over the conductor 25A to one input terminal of the AND network 41 of the tripping network 24.

The flow of ground or residual current is sensed by the $I_L$ overcurrent device 60 of the network 23 and since this current will exist for more than 4 ms., the timer 90 of the network 23 will time out and provide a logical 1 output signal of the conductor 28 to the second input terminal of all of the AND networks 41, 42 and 43. Therefore when the timer 90A of the network 20 and the timer 90 of the network 23 both time out, the AND network 41 will supply a logical 1 output signal to the OR network 34 which trips the breaker 10 to disconnect this faulted phase conductor 4 from the bus 1.

In the event of a phase-to-phase fault or the faulting of two phases to ground whereby two breakers open, the voltage on the busses associated with the two disconnected phase conductors tends to rise. Therefore it is often preferred to trip the remaining breaker and disconnect the unfaulted but ineffective phase conductor. This is accomplished by connecting the output conductors 25, 26 and 27 of the networks 20, 21 and 22 to the three input terminals of the ANY-2-OR network 40. This network 40 provides a logical 1 signal to each of the OR networks 34, 36 and 38 whenever logical 1 input signals are supplied to at least two of its input terminals. A logical 1 signal output of the ANY-2-OR network 40 will cause all of the breakers 10, 11 and 12 to trip.

Under many if not most instances a loss of signal is of short duration and often occurs at the inception of the fault and within a short time period the signal will be reestablished. The timer 134 is set to time out a time interval of 150 ms. since, if the signal is not reestablished during this interval, it is assumed that the loss of signal is permanent. Any momentary reestablishment of the normal input signal prior to the timing out of the timer 134 (as well as of the timers 90, 90A, 90B) will reset the timer to its initial condition so that the timer 134 always requires the loss of signal to be continuous for the full 150 ms. (or such other time period as may be desired). The timer 134, after once timing out, is arranged to provide a 10 ms. interval after the signal is reestablished and a normal or logical 1 signal is reapplied to its NOT input terminal so that any momentary logical 1 input signal to the timer will not reset it. The 10 ms. resetting time is based on the premise that the continued presence of the logical 1 signal for a 10 ms. interval is presumptive of the reestablishment of the signal.

A loss of signal conductor 125 is connected directly to the input terminal 127 of AND network 110 so that as soon as there is a loss of signal (failure of the receiver 78 to provide a logical 1 output signal to the conductor 125), the AND network 110 is immediately prevented from actuating either of the timers 90 and 90A. The conductor 125 is connected to the NOT-input terminal 127A of the AND network 110A so that the loss of signal applies the remaining arming signal thereto since this network is already armed by a logical 1 signal at terminal 54B from the fault detector 58 and the NOT terminal 137A is supplied with a logical 0 signal from the timer 134. Therefore the AND network 110 will cause the timer 90B to time out.

The timer 90B is arranged to provide a timing period which is short enough to prevent excessive damage to the faulted line and its associated equipment and longer than the usual expected loss of signal interval. The exact setting is a compromise between the prevention of excessive fault caused damage and the prevention of the tripping of the breaker by faults external to the protected line sections.

If desired, as illustrated in said continuation application Ser. No. 402,687, a second fault detector responding to a very high magnitude of fault current may be provided to actuate the breaker independently of the phase comparison determinator 56. Such high magnitudes of fault current are normally caused by a fault within the protected line section and because of the high magnitude of fault current needed to be promptly interrupted.

The frequency verifier block network 192 disarms the AND network 110 and prevents tripping of the breaker due to any high frequency current transients flowing through the associated current transformers. The frequency verifier drive network 65 filters out the low frequency offset in the output of the current transformers to permit the superimposed alternating signal to be supplied at the frequency verifier blocking network 192. The networks 65 and 192 are more fully shown and described in said continuation application Ser. No. 402,687.

During normal operation, no D.C. or low frequency offset of high frequency transients of a troublesome nature will normally be present, but such may occur as for example when the fault occurs at or following reclosure of a breaker in the system. The frequency verifier 65 includes a high pass filter network and filters out any low frequency offset in the output of the current transformer and delivers the superimposed alternating signal to the input terminal 191 of the frequency verifier blocking network 192.

In the absence of such a superimposed alternating signal which is the normal operating condition of the current transformers, the frequency verifier block 192 will not be pulsatingly actuated and the block 192 will supply a logical 0 arming signal to the NOT input terminal 213. When however high frequency transients are present, these superimposed alternating signals pulsatingly actuated the block 192 and a logical 1 disarming signal is supplied to the AND network 110 which remains disarmed until the transient disappears.

The fault detector 58 may take many forms in which a fault current will produce a logical 1 output. Such a detector may detect the fault as a sudden discontinuity in the alternating current wave. Such a fault detector is shown and claimed in U.S. Letters Pat. No. 3,654,516 to M. Traversi and assigned to Westinghouse Electric Corporation.

In the absence of a fault condition, logical 0 signals will be supplied to the input terminals 97 and 98 of the keyer 72 whereby the transmitter frequency control 76 causes the transmitter-receiver 78 to transmit a guard signal to the companion transmitter-receiver at the remote other end of the protected line section. Similarly, the absence of a fault causes the remote transmitter-receiver 78 to transmit a guard signal to the local transmitter-receiver 78 whereby a logical 1 signal will be supplied to the input terminal 103 of the phase comparison determinator. This is in turn applied to the NOT input terminal 124 of the AND network 110 and will prevent the AND network 110 from supplying a logic 1 output signal at its output terminal. In the absence of excessive noise in the transmission, a logical 0 signal will be applied to the input terminal 123 and thereby to the NOT input terminal 124 of the AND network 110 thereby arming this terminal of the AND network. As long as the signal received by the transmitter-receiver 78 is of acceptable magnitude, a logical 1 output signal will be applied to the conductor 125 to the input terminal 126 and to the terminal 127 of the AND network 110 thereby arming this terminal of the AND network.

The NOT input terminal of the AND network 146 of said copending continuation application Ser. No. 402,687 as well as the NOT input terminal 127A of the AND network 110A hereof are armed by the failure of the receiver to supply logical 1 signals thereto. Both of these AND networks are held disarmed during a non-fault transmission to the receiver of a magnitude suitable for proper operation thereof. Both AND networks (as far as these input terminals are concerned) become armed when the receiver fails to receive the non-fault transmission of a magnitude suitable for proper operation of the receiver.

In the event of the occurrence of a fault, a logical 1 signal is supplied to the input terminal 98 of the keyer 72 which in conjunction with the $I_{SW}$ signal applied to the input terminal 71 actuates the transmitter frequency control 76 to drive the local receiver between high frequency trip-positive and low frequency trip-negative to provide the $RI_{SW}$ signal at the remote terminal. Similarly, the fault detector at the remote terminal will actuate the remote keyer to cause the remote transmitter to terminate its transmission of the guard signal and to transmit alternatively its high frequency (trip-positive) and its low frequency (trip-negative) signals (alternating logical 1 and logical 0 signals) whereby the local receiver 78 will provide the $RI_{SW}$ signal on conductor 81 and because of the absence of the guard signal a logical 0 arming signal at the NOT input terminal 108 of AND network 110. The signal $RI_{SW}$ represents the alternating half cycles of the current at the remote portion of the line. The signals $I_{SWPD}$ are supplied to the input terminal 85 and the signals $I_{SWND}$ are supplied to the input terminal 86 and therethrough to the non-inverted terminals of the AND network 82A and 82B; the $RI_{SW}$ signal being applied to the other non-inverted input of the AND network 82A and the inverted input of AND network 82B. If the phase of these signals is such that logical 1 signals are applied simultaneously to the AND network 82A and logical 1 and logical 0 signals are applied simultaneously to the AND network 82B, the AND networks will actuate the OR network 82A to place a logical 1 signal at the input terminal 87 of AND network 110. If at the same time the fault detector 58 is applying a logical 1 input signal to the input terminal 54 and therethrough to terminal 54A, the AND network will provide a logical 1 output signal to initiate timing out of the timers 90 and 90A.

In the event of the simultaneous occurrence of a fault and the deterioration of the incoming signal below a useable magnitude the AND network 110A becomes effective for the first 150 continuous milliseconds of this time interval to permit the breaker 10 to be tripped by the local fault detector 58 independently of the phase comparison of the relaying network if the fault is detected for the timing interval of the timer 90B which is set for a sufficiently long time interval to provide the necessary security and necessary protection to the network which interval is shown to be preferably is greater than that of the timer 90. When such a fault exists, the timer 90B times out and operates through the OR network 91 and through the OR network 34 to trip the breaker 10, 11 or 12 as the case may be. At the end of the continuous 150 millisecond time interval, the network 20 is rendered unable to trip the breaker 10 until and unless a satisfactory signal has been established for a continuous time interval of 10 milliseconds at which time the network 20, 21, 22 or 23 as the case may be operates as above described.

Assuming the existence of a phase-to-phase fault, the relaying network 23 will not be energized to supply a logical 1 signal to the AND network 41 and timing out of the timer 90A is without effect. Timing out of the timer 90 actuates the OR network 91 and thereafter the OR network 34 to trip the breaker 10. Assuming a ground fault on the phase conductor 4 of a fairly low resistance, the AND network 110 of network 20 will cause the timers 90 and 90A to time out as described in connection with a phase-to-phase fault, however, in this instance the timer 90 of the ground or residual fault current network 23 will also time out and apply a logical 1 signal to the AND network 41 so that the OR network 34 will be actuated by two logical 1 signals to trip the breaker 10. In this regard, it should be noted that even though the timers 90 of the network 20 and 23 do not exactly time out together, their timing will continue as long as the fault current flows which is until the breaker actually opens so that from a practical point of view both logical 1 signals to the OR network 34 will be applied and this provides a back up of protection for the network 20.

The phase angle between the fault current at the two ends of the protected zone of the transmission line varies from an inphase condition with an unfaulted line to a 180° out of phase condition for a "perfect" internal fault. An unfaulted line will have no "overlap" (out-of-phase component) and the "perfect" interval fault will have a 180° "overlap." Assuming a 60 hertz transmission as is usual in the United States, the time interval of the "perfect" fault "overlap" will have about 8.3 milliseconds. Since the phase angle detecting AND networks 82A and 82B are alternatively energized, a "perfect" internal fault theoretically could provide a continuous logical 1 signal to the terminal of the AND network 110, however a "perfect" fault even if theoretically possible will seldom if ever occur and the logical 1 signals from the OR network 86A will be a series of spaced signals because with modern apparatus a hiatus will occur between consecutive half cycles of the system hertz. In the case of a low resistance powered fault with a high load power flow through the transmission line an "overlap" time of about 6 milliseconds may be expected. In the case of a high resistance ground fault with high load power flow through the transmission line an overlap time of about 3 milliseconds or less may be expected. Variations in transmitted load power with respect to fault resistance will provide a multitude of different "overlap" times.

In order to prevent false tripping of the breaker from line disturbances caused from switching and other transient surges which do not require opening of the breaker, a sufficient "overlap" time must occur before the breaker is tripped to make sure that an internal fault actually occurs. In practice it has been found that a 4 millisecond timed "overlap" (a timer 90 set for 4ms timing) gives adequate security against false tripping. As is set out above, in case of high resistance ground faults and high load power flowing in the phase conductor, the "overlap" time may be too short to cause the timing out of a 4ms timer and no tripping of the breaker would occur.

In accordance with the teachings herein the ground or residual fault current network 23 is utilized to detect the occurrence of a ground fault and 2/0 millisecond timers 90A are used to determine the faulted conductor. The "overlap" time of the ground fault current is independent of the ground fault current magnitude and consequently of the ground fault resistance, it being necessary to be sufficient to enable it to be detected. Therefore this network 23 utilizes the full 4 millisecond interval to be sure that the ground fault is within the protected line section. The detection of a ground fault by the network 23 cannot of itself determine which of the phase conductors is faulted and this information is necessary to determine which of the breakers 10, 11 or 12 are to be opened.

In prior art systems which trip the breakers in all of the phase conductors, this lack of detecting which phase conductor is faulted is unnecessary. When however as in the subject protective relay the breakers are individually opened it is essential that information be supplied as to which of the phase conductors is faulted.

In accordance with the teachings hereof, this information is obtained by using a timer 90A which is less than any expected minimum "overlap" time with a high resistance ground fault and with high load power flowing through the conductor. Since as set forth above, this expected minimum "overlap" time in the subject time is 3 milliseconds, the timer 90A is set to time out at a slightly shorter time which is shown herein as being 2 milliseconds.

The output of the network 23 is connected to the lower input terminal of each of the AND networks 41, 42 and 43 whereby the occurrence of an internal ground fault will supply a logical 1 signal to all three AND networks. Unless and until the ground fault network 23 recognizes the existance of a ground fault on the line this logical 1 signal will not be supplied and the AND networks 41, 42 and 43 will be unable to trip the breaker 10, 11 or 12.

As stated above the AND network 110 of the network 20, 21 and 22 will provide a logical 1 output upon the occurrence of a fault on the phase conductor with which it is associated and is utilized to supply the information which determines which one of the phase conductors is faulted. The outputs of the timers 90A of the networks 20, 21 and 22 are individually connected to the upper input terminals of the AND networks 41, 42 and 43 and will supply when timed out a logical 1 signal thereto. Assuming a ground fault on phase conductor 4, the AND network 41 will supply a logical 1 signal and the breaker 10 will trip to disconnect the phase conductor 4 even though the overlap time at the network 20 is insufficient to trip the breaker 10 without the supervision of the ground or residual fault network 23 and it will be the only AND network to do so.

What is claimed and is desired to be secured by United States Letters Patent is as follows:

1. A breaker tripping system for a polyphase power transmission having an n number of phase conductors and an n number of breakers controlling the energization of said phase conductors, said systems comprising an n number of phase conductor fault determining networks individually associated with said n phase conductors, each of said fault determining networks having an output terminal energized with a logical fault signal in response to the occurrence of a fault on the said phase conductor with which it is associated, a residual fault determining network associated with said line, said residual fault determining network having an output terminal energized with a logical fault signal in response to the occurrence of a residual fault on the said line, $n$ number of AND networks, each said AND network having a plural number of inputs and an output, first circuit means individually connecting a first of said inputs of said $n$ AND networks to said output terminal of said n phase conductor fault determining networks, second circuit means connecting a second of said inputs of said n AND networks to said output terminal of said residual fault determining network, and third circuit means individually connecting said output of said $n$ AND networks to said n breakers, each said AND network being operable in response to the existence of a logical fault signal at both of its said inputs to provide a tripping signal at its said output terminal for its associated said breaker.

2. The system of claim 1 in which there is provided an n number of first timers and 9 second timers, said $n$ first timers being included in said first circuit means, each said first timer being operable to delay for a first predetermined interval the transmissions of the said logical fault signal by the associated said first circuit means to the said first input of the AND network to which said associating said first circuit means is connected said second timer being including in said second circuit means and operable to delay for a second predetermined interval the transmissions of said logical fault signal of said residual fault determining network to said second inputs of said AND networks, said first intervals being of lesser duration than said second interval.

3. The system of claim 2 in which each of said fault determining networks includes comparing means for comparing the direction of the current flow at first and spaced locations along said power transmission line, said comparing means being effective to limit the time period that the said output terminal of the associated said fault determining network is energized with its said logical fault signal to the overlap time of the current at said spaced locations, said overlap time being the time that said current flow at said spaced location is in the same direction with respect to a location intermediate said spaced locations.

4. The system of claim 3 in which there is provided an n number of third timers and an n number of OR networks, each said OR network having first and second inputs and an output, each said third timer having an input and an output, said inputs of said n third timers being individually connected to said output terminals of said n fault determining networks and operable to delay for a third predetermined interval of the transmission of a logical signal to said first input of the said OR network with which it is associated, said outputs of said n third timers being individually connected to said first inputs of said n OR networks, said third circuit means individually including said second inputs and said outputs of said $n$ OR networks.

5. The system of claim 4 in which the timing interval of said third timers is greater than the timing interval of said first timers.

6. The system of claim 4 in which the timing interval of said third timers is the same as the timing interval of said second timer.

7. A protective relaying system for a polyphase power transmission line having n number of first phase conductors individually connected to $n$ number of second phase conductors through n number of circuit breakers; n + 1 number of apparatuses; each of said $n$ + 1 apparatuses comprising a local current sensing device having a local output quantity which has a characteristic which indicates the phase of the local current, a receiver for energization from a remote current energized device and providing a remote output quantity at its said associated said apparatus which has a characteristic indicating the phase of the remote current, a quantity comparing network having a pair of inputs and an output, a first timer having an input and an output, and a breaker tripping circuit having an input; each of said n apparatuses having a second timer and a local fault detector; said fault detector and said local current sensing device and said remote current energized device of said n apparatuses being energized in accordance with the operating characteristic of the said phase conductor with which the respective one of said n apparatuses is individually associated; each said quantity comparing network having its pair of inputs operatively connected to said local current sensing device and to said remote current energized device for comparison of said local and remote quantities and effective to provide an output signal at its said output which is a function of the phase relationship of said current at said local and remote terminals, each said apparatus having a first and a second circuit actuating network, each of said circuit actuating networks having an energizing input and an arming input and a breaker tripping output, each of said first circuit actuating networks having its said energizing input connected to said output of its associated said comparing network and its said arming input connected to its associated said fault detector, each of said n apparatuses having said inputs of its said first and second timers connected to said output of its said first circuit actuating network and effective to time out upon energization of its associated said breaker tripping output, the remaining one of said $n$ + 1 apparatuses having its said current sensing device and its said receiver energized by the local and remote residual current flowing in said transmission line and having said input of its said first timer connected to said output of its said first circuit actuating network and effective to time out upon energization of its associated said breaker tripping output, said output of said first timer of said remaining one of said n + 1 apparatuses being connected to said arming inputs of each of said second circuit actuating networks, each said second circuit actuating network having its said energizing input connected to said output of the said second timer with which such said second switching network is associated, said breaker tripping circuit of each of said n apparatuses being connected to said output of its associated said second switching network and of its associated said first timer.

8. The combination of claim 7 in which said circuit actuating networks are AND networks.

9. The combination of claim 7 in which there is provided an ANY-2-OR network having n number of inputs and an output, said n inputs of said ANY-2-OR network being individually connected to said outputs of said first timers of said n apparatuses, said output of said ANY-2-OR network being connected to each of said breaker tripping circuits of said n apparatuses.

10. The combination of claim 9 in which said fault detectors each respond to the occurrence of above a predetermined magnitude to apply an arming signal to the said arming input to which it is connected, each of said local current sensing devices and of said remote energized device including current squaring devices whereby said characteristics of said output quantities are square waves having half cycle duration substantially equal to the half cycle durations of the current in said phase conductors.

11. In a protective relaying system for protecting a polyphase transmission line having a line conductor for each of said phases, said system comprising an apparatus for each of said phases; each said apparatus including a plurality of AND networks, a plurality of timers, a fault detector, a receiver, a signal phase comparing network, said receiver having a first output connected to first input terminals of first and second of said AND networks, for supplying signals thereto, said receiver being effective when receiving a signal indicative of the reception of a fault responsive signal to supply operating signals to each of said just-named first input terminals and to energize a first input terminal of said phase comparing network with a signal which is representative of the remote line operating characteristic being transmitted to said receiver, means connected to a second of said input terminals of said phase comparing network and effective to energize said just mentioned second input terminal with a signal which is representative of the local line operating characteristic said fault detector being individually associated with the said phase conductor with which its said apparatus is associated and effective to provide a current signal which is proportional to the magnitude of the current in the said phase conductor with which it is associated, said fault detector having an output terminal connected to second input terminals of said first and said second AND networks and effective to provide an operating signal to said just-named second input terminals solely when said fault detector is responding to a fault condition, a first of said timers having an input connected to said receiver and an output connected to a third input terminal of said first and second AND networks, said timer being effective in the absence of an output signal from said receiver to time out a time interval and to thereafter supply a non-operating signal to said just-named third input terminals, a second of said timers having an input connected to said output of said first AND network, a third of said timers having an input connected to said output of said second AND network, said first and said second AND networks being effective to provide an operating signal to the said one of said timers associated therewith solely when all of its said input terminals are energized with an operating signal, a breaker operating network, each of said second and said third timers being effective when timed out to actuate said breaker operating network, phase current interrupting circuit breaker individually associated with each of said phase conductors, each said breaker operating network being individually associated with the one of said breakers which is associated with the one of said phase conductors with which its said apparatus is associated and being effective when actuated to trip individually the said breaker with which such breaker operating network is associated, each said first apparatus further including a fourth of said timers and a third of said AND networks, each said AND network having a plurality of inputs and an output, said fourth timer having its input connected to said output of said first AND network and its said output connected to a first input of said third AND network, a residual current detecting means connected to each of said fault detectors and effective to provide a residual current output which is proportional to the magnitude of the unbalance in the phase conductor current, a fifth timer having an input connected to said residual current detecting means and an output connected to a second terminal of each of said third AND networks, each of said third AND networks having its said output connected to actuate the said breaker operating network of the said apparatus with which said AND network is associated, each said fourth timer having a lesser time interval than the said second timer associated with the same said apparatus.

12. The combination of claim 11 in which each said second timer has a lesser time interval than the said third timer associated with the same said apparatus.

13. The combination of claim 11 in which there is provided an ANY-2-OR network, having a plurality of inputs and an output, said ANY-2-OR network being characterized by the fact that its said output is actuated solely when two or more of its said inputs are actuated, means individually connecting said inputs of said ANY-2-OR network to said outputs of said second timers, and means operatively connecting said output of said ANY-2-OR network to each of said breaker for actuation thereof when said second timers of any two of said aparatuses time out.

* * * * *